United States Patent
Kennedy

(12) 
(10) Patent No.: US 6,201,855 B1
(45) Date of Patent: Mar. 13, 2001

(54) TELEPHONE HANDSET OFF SWITCHHOOK AND CALL HOLDING ALERT SYSTEM

(75) Inventor: Dennis M. Kennedy, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 08/994,299

(22) Filed: Dec. 19, 1997

(51) Int. Cl.[7] .............................. H04M 1/24; H04M 3/08; H04M 3/22
(52) U.S. Cl. .............................. 379/33; 379/32; 379/377; 379/387
(58) Field of Search .................................. 379/177, 179, 379/182, 162, 163, 164, 70, 76, 88.12, 88.28, 373, 375, 374, 377–379, 32–33

(56) References Cited

U.S. PATENT DOCUMENTS

| 3,961,142 | 6/1976 | Caffine . |
| 4,468,528 | 8/1984 | Reece et al. . |
| 4,517,410 | 5/1985 | Williams et al. . |
| 4,577,067 | 3/1986 | Levy et al. . |
| 4,834,551 | 5/1989 | Katz . |
| 4,903,291 | 2/1990 | Tsurufuji et al. . |
| 4,932,050 | 6/1990 | Davidson et al. . |
| 5,592,529 | 1/1997 | Linsker . |
| 5,606,593 | * 2/1997 | Smith .................................. 379/177 |
| 5,612,997 | 3/1997 | Vallelonga, Sr. et al. . |

FOREIGN PATENT DOCUMENTS

| 0 027 188 | 4/1981 | (EP) . |
| 0 128 500 | 12/1984 | (EP) . |
| WO 97/20121 | 6/1997 | (WO) . |

OTHER PUBLICATIONS

European Patent Office, International Search Report, Mar. 18, 1999.

* cited by examiner

*Primary Examiner*—Duc Nguyen

(57) ABSTRACT

Disclosed is a telephone alert system that comprises a telephone and a device for indicating that the telephone requires attending. The indicating device includes a call holding alert mechanism for alerting a party on hold that the hold initiating party is ready to resume conversation, and a further mechanism for alerting someone that the telephone handset is inadvertently disengaged from the switchhook. Both alert mechanisms make use of the alert tone of the telephone chassis ringer for notification purposes.

10 Claims, 1 Drawing Sheet

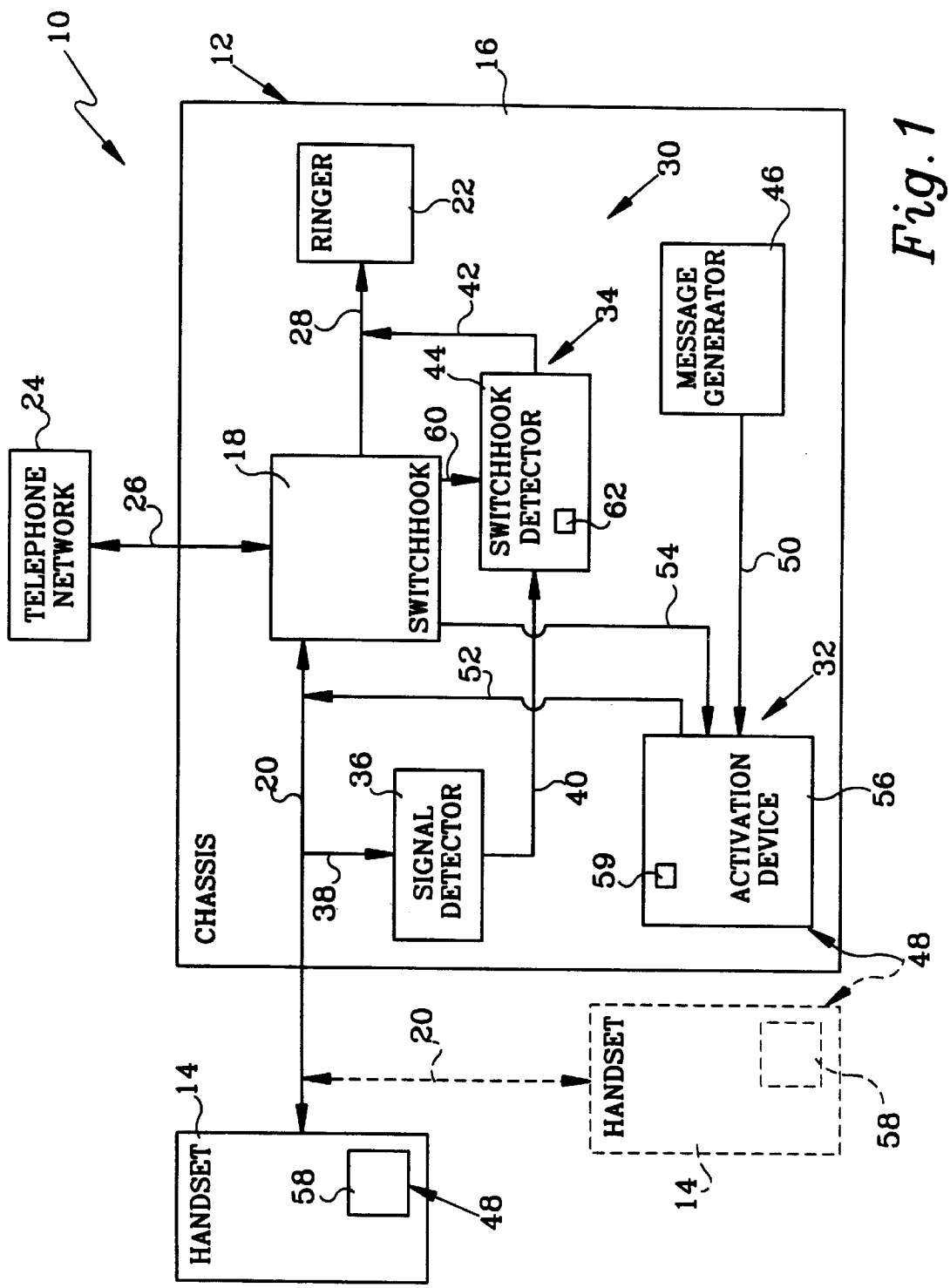

TELEPHONE HANDSET OFF SWITCHHOOK AND CALL HOLDING ALERT SYSTEM

BACKGROUND OF THE INVENTION

This invention relates to telephones. In particular, the present invention is a system for alerting a someone that the telephone handset is off the switchhook and for alerting a telephone user that a hold initiating party is ready to resume conversation.

One of the more annoying features of using the telephone is to be placed on telephone "hold". Typically, the party put on hold is left to listen to music or a commercial advertisement for a long period of time. This circumstance is tremendously irritating and time wasting, particularly for a business person who is unable to pursue other work activities while listening to the telephone handset for the return of the hold initiating party. One option for the party on hold is to simply place the handset down next to the telephone chassis and hope that he/she will hear the hold initiating party's voice upon return. However, since the sound of the hold initiating party's voice is transmitted at the ear piece of the handset, it is difficult to hear and may lead to the party on hold missing the return of the hold initiating party. This typically leads to the telephone line disconnection (i.e., handset "hang-up") by the hold initiating party. This circumstance leads to a further telephone problem, in that the party on hold has been disconnected and he/she is unaware of this occurrence.

In a typical business telephone line system there is nothing to alert the telephone user that the telephone line is not active and the handset is inadvertently off of the switchhook. With the handset off of the switchhook, the telephone of the telephone user is incapable of receiving in-coming calls. This situation results in the telephone user missing these, possibly important, telephone calls.

Typical residential telephone line systems do have a system to alert someone that the handset is off of the switchhook. This situation may be occasioned by a telephone user simply not placing the handset back on the telephone base unit properly or by small child who may have accidentally dislodged the handset from the switchhook. This alert system typically takes the form a of tone or repeating message that is transmitted through the earpiece of the handset to alert someone to replace the handset on the switchhook. However, since this alert tone or repeating message is delivered through the handset earpiece, it is inadequate because it is difficult to hear, and therefore could result in the handset being off of the switchhook (and the inability of the telephone to receive in-coming calls) for hours. This situation may be critical, particularly with respect to elderly individuals who may rely on an incoming call as a safety link to relatives or friends.

There is a need for telephone handset off switchhook and call holding alert systems. In particular, there is a need for a system that will provide someone with adequate alert that their telephone handset is off of the switchhook. In addition, there is a need for a system that will alert a party on hold that the hold initiating party is ready to resume conversation. This would allow the party on hold to pursue other activities during the telephone hold time period. Lastly, the telephone handset off switchhook and call holding alert system should make as much use of the standard components incorporated into the telephone so as to be relatively easy and inexpensive to implement.

SUMMARY OF THE INVENTION

The present invention is a telephone alert system comprising a telephone and a device for indicating that the telephone requires attending. The telephone includes a telephone handset and a telephone chassis. The telephone chassis is defined by a switchhook, a ringer for producing an alert tone and a signal transmission line for coupling the handset to the switchhook. The switchhook is further coupled to a telephone line network which is capable of transmitting and receiving signals to and from the telephone. These signals are delivered to the handset when the handset is disengaged from the switchhook. The ringer is coupled to the switchhook and produces the alert tone when the handset is engaged with the switchhook and the signals are transmitted to the telephone from the telephone line network. The alert tone ceases upon disengagement of the handset from the switchhook. The indicating device includes a call holding alert mechanism for alerting a party on hold that the hold initiating party is ready to resume transmitting and receiving signals. The indicating device includes a further mechanism for alerting someone that the telephone handset is inadvertently disengaged from the switchhook. Both alert mechanisms are linked to the telephone chassis ringer.

This telephone handset off switchhook and call holding alert system provides adequate alert that the telephone handset is off of the switchhook. Adequate alert is provided since this telephone alert system makes use of the easy to hear ringer of the telephone chassis, instead of the hard to hear handset earpiece as used in residential telephone line systems or the non-existent alert of the business telephone line systems. In addition, this telephone alert system makes further use of the telephone chassis ringer to alert a party on hold that the hold initiating party is ready to resume conversation. This allows the party on hold to pursue other activities during the telephone hold time period. Lastly, this telephone alert system uses many of the standard components incorporated into the telephone to provide these features and as such, this alert system is relatively easy and inexpensive to implement.

BRIEF DESCRIPTION OF THE DRAWINGS

FIG. 1 is a schematic illustration of the telephone handset off switchhook and call holding alert system in accordance with the present invention.

DETAILED DESCRIPTION OF THE PREFERRED EMBODIMENT

A telephone handset off switchhook and call holding alert system 10 in accordance with the present invention is illustrated in FIG. 1. The alert system 10 includes a telephone 12 defined by a telephone handset 14 and a telephone chassis 16. The handset 14 includes the standard telephone handset components, such as a transmitter, receiver, etc. (not shown). The telephone chassis 16 is defined by a switchhook 18, a signal transmission line 20, a ringer 22 for producing an alert tone and other standard telephone chassis components, such as a dial, an anti-sidetone network, etc. (not shown). The switchhook 18 is coupled to the handset 14 by way of the signal transmission line 20. The switchhook 18 is further linked to a telephone line network 24 via a phone line 26. The telephone 12 transmits and receives signals to and from the telephone line network 24 through the phone line 26. These signals are sent and received to and from the handset 14, when the handset 14 is disengaged from the switchhook 18. The ringer 22 is linked to the switchhook 18 via a signal line 28. The ringer 22 produces the alert tone when the handset 14 is engaged with the switchhook 18 and the signals (i.e., an in-coming call) are transmitted to the telephone 12, through the phone line 26, from the telephone line network 24. The alert tone of the ringer 22 ceases upon disengagement of the handset 14 from the switchhook 18. In other words, the alert tone of the ringer 22 ceases when the in-coming call is answered.

The alert system 10 further includes an indicating device 30 for notifying a local telephone party that the telephone 12 needs attending. The indicating device 30 is coupled to the ringer 22, and activates the ringer 22 to produce the alert tone under circumstances other than when the handset 14 is engaged with the switchhook 18 and there is an in-coming call from the telephone line network 24. The indicating device 30 is defined by a call holding alert mechanism 32 and a handset off switchhook alert mechanism 34.

The call holding alert mechanism 32 alerts a local party on hold that a remote hold initiating party is ready to resume the conversation (i.e., resume transmitting and receiving signals over the telephone line network 24. The call holding alert mechanism 32 includes signal detector 36 which is coupled to the signal transmission line 20 via a signal line 38. The signal detector 36 is further coupled to the ringer 22 via signal lines 40 and 42 and a switchhook detector 44 of the switchhook alert mechanism 34. The signal detector 36 detects a predetermined signal transmitted on the signal transmission line 20 by the remote hold initiating party. The signal indicates that the remote hold initiating party is ready to resume the conversation. The call holding alert mechanism 32 further includes a message generating device 46. The message generating device 46 generates a message to inform the remote hold initiating party as to how to generate the predetermined signal. The message generating device 46 is linked to an activation device 48 of the call holding alert mechanism 32 via a signal line 50. The activation device 48 is further linked to the signal transmission line 20 and the switchhook 18 via signal lines 52 and 54, respectively. The activation device 48 is defined by a proximity detector 56 mounted in the telephone chassis 16 and a proximity activation element 58 mounted in the handset 14. The proximity detector 56 includes an internal delay timer 59.

In operation of the call holding alert mechanism 32 of the alert system 10, the activation device 48 is activated by the local party after being put on hold by the remote party. The activation device 48 is activated upon placement of the proximity activation element 58 of the handset 14 within a predetermined distance of the proximity detector 56 of the telephone chassis 16. This is illustrated by the position of the dashed line handset 14 of FIG. 1. In one preferred embodiment, the proximity activation element 58 and proximity detector 56 are magnetically based and the predetermined distance is substantially eight inches. The internal delay timer 59 of the proximity detector 56 provides a five second time delay so that the proximity activation element 58 does not activate the proximity detector 56 when the handset 14 is initially disengaged from the switchhook 18 to answer an in-coming call. The five second time delay is sufficient to allow the proximity activation element 58 to be moved outside of the eight inch predetermined distance upon answering of the telephone 12. Handset 14 disengagement from the switchhook 18 is detected by the proximity detector 56 via signal line 54.

The proximity activation element 58 (of the activation device 48) activates the proximity detector 56 (of the activation device 48) which in turn activates the message generating device 46 to produce the message (which contains the instructions for generating the predetermined signal) on the signal transmission line 20 for the remote hold initiating party. In one preferred embodiment, the message generating device 46 is solid state, speech synthesis integrated circuit, delivering a repeating verbal message, such as "To resume conversation press 1.". When the remote hold initiating party is ready to resume the conversation, the remote party generates the predetermined signal as detailed by the message of the message generating device 46. In the one preferred embodiment the remote hold initiating party presses "1". This predetermined signal is detected by the signal detector 36 which activates the ringer 22 (through signal lines 40, 42 and 28 and the switchhook detector 44) to produce the alert tone indicating to the local party on hold that the remote hold initiating party is ready to resume the conversation. In one preferred embodiment, the signal detector 36 is a tone detector for detecting a dual-tone multifrequency (DTMF) signal, such as the predetermined signal "1". The local party on hold then picks up the handset 14, which moves the proximity activation element 58 of the handset 14 form within the predetermined activation distance to outside of the predetermined activation distance, thereby deactivating the proximity detector 56 which in turn deactivates the message generating device 46 and the ringer 22. This is illustrated by the position of the solid line handset 14 of FIG. 1.

The handset off switchhook alert mechanism 34 alerts a local telephone party that the handset 14 is disengaged from the switchhook 18 without signals being transmitted and received from the telephone line network 24. In other words, the handset off switchhook alert mechanism 34 alerts someone to the fact that the handset 14 is unintentionally off of the switchhook 18, and therefore the telephone 12 is incapable of receiving in-coming calls. The handset off switchhook alert mechanism 34 includes the switchhook detector 44 which is linked to the switchhook 18 via signal line 60 and to the signal detector 36 and ringer 22 via the signal lines 40 and 42, respectively. The switchhook detector 44 includes an internal delay timer 62.

In operation of the handset off switchhook alert mechanism 34 of the alert system 10, the switchhook detector 44 through signal line 60 detects disengagement of the handset 14 from the switchhook 18. This activates the internal delay timer 62 thereby initiating a predetermined time limit. In one preferred embodiment, the internal delay timer 62 is set at a predetermined time limit of ten minutes. Upon expiration of the predetermined time limit of the timer 62 and the non-transmission and receipt of signals on the signal transmission line 20 (monitored through signal lines 38 and 40 and the signal detector 36), the switchhook detector 44 activates the ringer 22 which produces the alert tone indicating to the local party that the telephone 12 requires attending. In other words, that the handset 14 is disengaged from the switchhook 18. Replacing the handset 14 on the switchhook 18 deactivates the switchhook detector 44 and the ringer 22. The transmission or receipt of signals through the signal transmission line 20 restarts the predetermined time limit of the internal delay timer 62.

The telephone handset off switchhook and call holding alert system 10 provides adequate alert that the telephone handset 14 is off of the switchhook 18. Adequate alert is provided since this telephone alert system 10 makes use of the easy to hear ringer 22 of the telephone chassis 16, instead of the hard to hear handset earpiece as used in residential telephone line systems or the nonexistent alert of the business telephone line systems. In addition, this telephone alert system 10 makes further use of the telephone chassis ringer 22 to alert a party on hold that the hold initiating party is ready to resume conversation. This allows the party on hold to pursue other activities during the telephone hold time period. Lastly, this telephone alert system 10 uses many of the standard components incorporated into the telephone 12 to provide these features and as such, this alert system 10 is relatively easy and inexpensive to implement.

Although the present invention has been described with reference to preferred embodiments, workers skilled in the art will recognize that changes may be made in form and detail without departing from the spirit and scope of the invention.

What is claimed is:

1. A telephone alert system comprising:

a telephone, including:

a telephone handset; and a telephone chassis, including:

a signal transmission line;

a switchhook coupled to the telephone handset, via the signal transmission line. and to a telephone line network, the switchhook being capable of transmitting and receiving signals to and from the telephone line network and sending and receiving these signals to and from the handset when the telephone handset is disengaged from the switchhook; and a ringer for producing an alert tone, the ringer being coupled to the switchhook and generating the alert tone when the handset is engaged with the switchhook and the signals are transmitted to the telephone from the telephone line network, the alert tone ceasing upon disengagement of the handset from the switchhook;

indicating means that the telephone requires attending the indicating means being coupled to the ringer and activating the ringer to produce the alert tone under circumstances other than when the handset is engaged with the switchhook and signals are transmitted to the telephone from the telephone from the telephone line network, the indicating means further including a call holding alert mechanism for alerting a local party on hold that a remote hold initiating party is ready to resume transmitting and receiving signals, the call holding alert mechanism further comprising:

signal detector means coupled to the signal transmission line and to the ringer for detecting a predetermined signal transmitted on the signal transmission line by the remote hold initiating party indicating that the remote party is ready to resume transmitting and receiving signals;

message generating means to inform the remote hold initiating party as to how to generate the predetermined signal; and activation means coupled to the message generating means and to the signal transmission line, wherein the local party, after being put on hold by the remote party activates the activation means, which in turn activates the message generating means to produce the message for the remote hold initiating party on the signal transmission line, and further wherein the remote party in response to the message, generates the predetermined signal which is detected by the signal detector means, which in turn activates the ringer to produce the alert tone indicating that the remote hold initiating party is ready to resume transmitting and receiving signals;

the indicating means further including a mechanism for alerting the local party that the handset is disengaged from the switchhook without the signals being transmitted and received from the telephone line network, the handset off switchhook alert mechanism including:

a switchhook detector coupled to the switchhook, the ringer and the signal detector means, wherein upon expiration of a predetermined time limit after the switchhook detector detects disengagement of the handset from the switchhook, and the non-transmission and receipt of signals on the signal transmission line, the switchhook detector activates the ringer to produce the alert tone indicating to the local party that the handset is disengaged from the switchhook.

2. The telephone alert system of claim 1 wherein the switchhook detector includes an internal timer set with the predetermined time.

3. The telephone alert system of claim 2 wherein the predetermined time is substantially 10 minutes.

4. The telephone alert system of claim 1 wherein the activation means includes:

a proximity detector mounted in the telephone chassis and coupled to the message generating means and the signal transmission line; and a proximity activation element mounted in the handset, wherein upon placement of the proximity activation element of the handset within a predetermined distance of the proximity detector, the proximity activation element activates the proximity detector which in turn activates the message generating means.

5. The telephone alert system of claim 4 wherein upon movement of the proximity activation element of the handset from within the predetermined distance to outside of the predetermined distance, the proximity detector is deactivated which in turn deactivates the message generating means.

6. The telephone alert system of claim 5 wherein the proximity detector and the proximity activation element are magnetically based.

7. The telephone alert system of claim 5 wherein the predetermined distance is substantially eight inches.

8. The telephone alert system of claim 1 wherein the indicating means includes a mechanism for alerting a local telephone party that the handset is disengaged from the switchhook without the signals being transmitted and received from the telephone line network, the handset off switchhook alert mechanism including:

a switchhook detector coupled to the switchhook, the ringer and the signal transmission line, wherein upon expiration of a predetermined time limit after the switchhook detector detects disengagement of the handset from the switchhook, and the non-transmission and receipt of signals on the signal transmission line, the switchhook detector activates the ringer to produce the alert tone indicating to the local party that the handset is disengaged from the switchhook.

9. The telephone alert system of claim 8 wherein the switchhook detector includes an internal timer set with the predetermined time.

10. The telephone alert system of claim 9 wherein the predetermined time is substantially 10 minutes.

* * * * *